Oct. 19, 1965 F. W. ELLERSICK, JR 3,213,268
DATA COMPACTOR
Filed Oct. 24, 1961
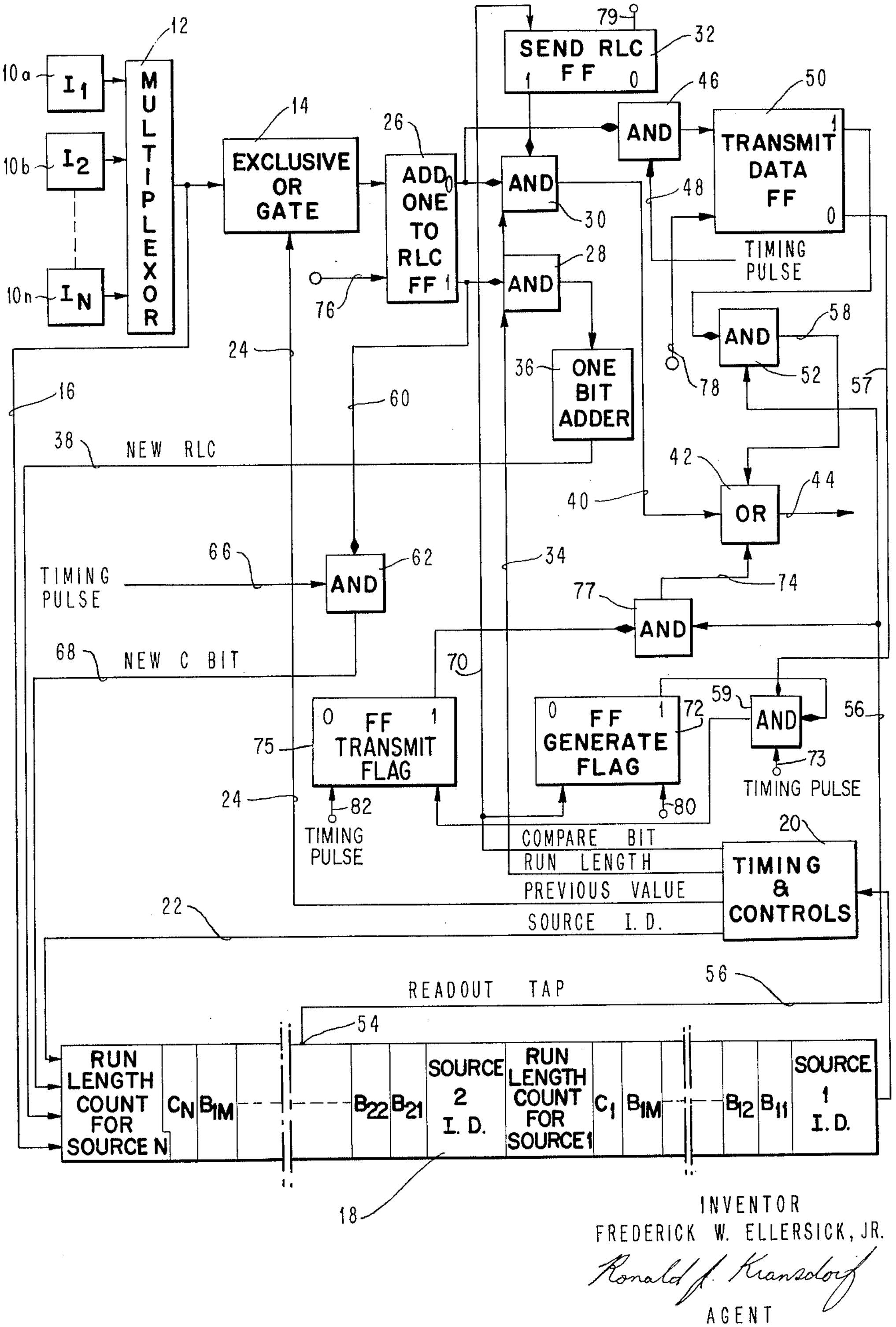
INVENTOR
FREDERICK W. ELLERSICK, JR.
Ronald J. Kransdorf
AGENT United States Patent Office 3,213,268
Patented Oct. 19, 1965

3,213,268

DATA COMPACTOR

Frederick W. Ellersick, Jr., Rockville, Md., assignor to International Business Machines Corporation, New York, N.Y., a corporation of New York Filed Oct. 24, 1961, Ser. No. 147,366
3 Claims. (Cl. 235—154)

The invention relates to data compactors and more particularly to a data compactor which is adapted to pass a block of data from a given source to the compactor output when, and only when, a change has occurred in the source.

Successive frames of binary data derived from a plurality of time-multiplexed sensors or other input sources generally contain large amounts of unwanted redundancy. When transmitting this data, it has been found that if some or all of these redundancies were eliminated by compacting the data, it would result in a number of advantages. Among these advantages are reductions in transmission time, bandwidth, power and/or error rate, and in storage requirements. If the compaction ratio (C) actually obtained is defined as the ratio of the average number of bits required to represent a message at the compactor input to the average number of bits for a message at the compactor output, then the transmission time (T) required for the same bandwidth can be reduced to $T/C$ or, alternatively, the bandwidth (W) can be reduced to $W/C$. Where weight is a factor, such as in missiles, satellites, and other space vehicles, data compaction, by reducing the power required to transmit the data, permits the use of lighter equipment. Since thermal noise is directly proportional to the bandwidth, the signal power (S) could be reduced to $S/C$ without increasing the signal to noise ($S/No$) ratio.

Another important advantage of data compaction is that it can be used to reduce the bit error rate. It has been shown that the probability of correctly identifying a signal is exponentially proportional to the signal energy. But where time and bandwidth are left the same, the signal energy (S′) for the compacted data is equal to CS (where S is the signal energy for the same data in uncompacted form). Therefore, the probability of a correct decision will be exponentially proportional to C. Since the removal of some of the redundancy from the data makes each bit of the remaining data more significant, it may be desirable, for some applications, to use some of the compaction to increase the signal energy and thus to obtain the desired reliability. The remainder of the compaction can be employed to reduce the time, bandwidth, or power required for transmission.

Finally, the compacted data will require a smaller memory to store it until it is needed. For example, in a space vehicle, where memory size and weight are important factors, data compaction would allow the use of a smaller, lighter, memory if the data is to be stored.

A coding scheme which may be used effectively to compact data when the input sequences have long periods of relatively constant signal is run length coding. With this coding scheme, each bit of a data sequence is compared with the corresponding bit of the preceding data sequence and an output generated only when there is a change. A count is kept of the number of comparisons between each output from the comparison circuit and this count is fed to the circuit output line when the comparison circuit generates an output.

One problem with run length coding is that, during periods of rapid fluctuation in the input data, this coding scheme may result in data expansion rather than data compaction. It is, therefore, desirable that a means be available to switch the compactor from run length coding to some other coding scheme, such as direct transmission, when rapid fluctuations in the input data occur. Most previous circuits for solving this problem have used the statistics of an entire frame of input data (all the data scanned in one complete scan of the input sources) to determine which coding scheme should be applied. These circuits may operate effectively when there are only small variations in the readings of the various input sources, but their compaction ratio is reduced markedly when there are large variations in a few of the sources.

It is, therefore, a general object of this invention to reduce the number of bits required to represent a given data sequence.

More specifically, it is an object of this invention to provide a circuit which will yield a high compaction ratio when the data from a few of the input sources display a large variation.

Another object of this invention is to provide a run-length-coded compactor which is capable of yielding a high compaction ratio when the input data from a few of the input sources is varying considerably.

In accordance with these objects, this invention provides a comparison circuit which is capable of accepting two binary inputs and generating an output only when the inputs disagree. The bits of each input source are simultaneously applied in succession to one input of the comparison circuit and to the input of a shifting storage means, such as a delay line. As the bits come out of the delay line, they are fed under control of a timing circuit to the other input of the comparison circuit, each bit from the delay line being timed to arrive at the comparison circuit simultaneously with the arrival of the corresponding bit of the next frame from the input source. Therefore, there is an output from the comparison circuit only when one of the bits of an input source has changed between frames. A count is maintained in the delay line at a position adjacent to the position in which the bits from a source are stored of the number of frames in which there has been no change in the given input source. A ONE is added to this count each time a comparison is made for the given input source and no change is found to have occurred. Gating means are provided to pass the stored count for a given input source and the bits of the given source stored in the delay line in succession to the circuit output line when a change is detected in one of the bits of the source. Identification means are provided to apply on the output line an indication of which input source the change occurred in. Still greater compaction is obtained by providing means for disabling the part of the gating means passing the stored counts when there is a change in the input source corresponding to that count in the preceding frame. This provision prevents the transmission of ZERO counts.

The foregoing and other objects, features and advantages of the invention will be apparent from the following more particular description of a preferred embodiment of the invention, as illustrated in the accompanying drawing.

The figure is a block diagram of a preferred embodiment of the adaptive compactor of this invention.

Referring to the figure, a plurality of binary data input sources 10a–10n are sequentially scanned by multiplexor 12. In the illustrative embodiment, the data in each input source is represented by bits $B_{x1}$–$B_{xm}$ (where $x$ is the number of the input sources). Each bit of the series of binary bits out of multiplexor 12 is applied simultaneously to EXCLUSIVE OR gate 14 and through line 16 to delay line 18. If the sources of input data were analog rather than digital, an analog-to-digital converter could be inserted in the circuit at a point between multiplexor 12 and the tap-off for line 16. EXCLUSIVE OR gate 14 is capable of accepting two binary inputs and of generating an output when these inputs disagree. The multiplexor and delay line 18 are synchronized, the delay line having a length and shift frequency such that the time it takes a bit to travel from one end to the other is equal to the time for one complete scan of the input sources (one frame). In addition to the scanned bits, $B_{11}$–$B_{NM}$ from the input sources, delay line 18 has stored therein a series of groups of source identification bits (source 1, I.D., source 2, I.D. etc.), one such series preceding the stored bits from each input source; a single comparison bit, $C_1$–$C_N$ (the purpose of which will be described later) associated with and following the bits for each input source, and a series of bits, following the comparison bit pertaining to the stored bits of each input source, for storing the run length count for that source (the number of frames in which there has been no change in that source). The number of bits required for the identification series will be equal to $\log_2 N$, where N is the number of input sources. It should be noted that each position of the delay line is identified by the bit of data stored in it and that these positions will shift as the data stored in them shifts through the delay line. The only time the positions are as shown in the figure is at the end of each frame.

The output from delay line 18 is applied to a timing and control circuit 20, which may be, for example, a rotating arm and commutator segements. This circuit time-separates the various classes of information stored in the delay line and directs each to its appropriate utilization circuitry. The source identification bits pass directly through line 22 to the input of the delay line. The data bits stored in the delay line are passed over line 24 to the other input of EXCLUSIVE OR gate 14. Since the time a bit spends in the delay line is equal to the time to scan the input sources 10*a*–10*n*, the bit coming in on line 24 will arrive at EXCLUSIVE OR gate 14 at the same time as the corresponding bit of the next succeeding frame. There will, therefore, be an output from the EXCLUSIVE OR gate only when the bit sensed in a given frame differs from the corresponding bit sensed in the preceding frame.

The output from EXCLUSIVE OR gate 14 is connected to the ZERO input of ADD ONE TO RLC (RUN LENGTH COUNT) flip-flop 26. This flip-flop is normally operating in the ONE state and is switched to its ZERO state by an output from the EXCLUSIVE OR gate. The flip-flop 26 is the primary means for determining whether the information relating to and the data for a given input source will be transmitted during a frame or whether the RLC for the source will be increased by ONE and the data transmission suppressed. The ONE output of this flip-flop is applied to condition AND gate 28, while the ZERO side of this flip-flop is applied to partially condition AND gate 30. The other conditioning signal for AND gate 30 comes from the D.-C. level output from the ONE side of SEND RLC flip-flop 32. This flip-flop operates under control of compare bits C to determine, in conjunction with flip-flop 26 whether the RLC for a given input source will be transmitted. The run length counts stored in the delay line are applied by timing circuit 20 to line 34 and through this line to AND gates 28 and 30. If AND gate 28 is conditioned, the count signals applied to it on line 34 will pass through it to ONE-BIT ADDER 36, where the count will be increased by one. The new run length count thus generated will be sent through line 38 to the input of delay line 18. If gate 30 is conditioned, the count signals will pass through line 40 and OR gate 42 to circuit output line 44.

The D.-C. level from the ZERO side of ADD ONE TO RLC flip-flop 26 is also applied to condition AND gate 46. When the last RLC bit for each input source has passed through timing and control circuit 20, a timing pulse will be applied through line 48 to AND gate 46. The output from AND gate 46 is applied to the ONE input of TRANSMIT DATA flip-flop 50. The D.-C. level output from the ONE side of this flip-flop is applied to condition AND gate 52. The other input to this AND gate is connected to readout tap 54 of delay line 18 by line 56. The output of AND gate 52 is connected through line 58 and OR gate 42 to the output line 44. The D.-C. level output from the ZERO side of flip-flop 50 is connected by line 57 to partially condition AND gate 59.

The D.-C. output level from the ONE side of ADD ONE TO RLC flip-flop 26 is also connected through line 60 to condition AND gate 62. After the least significant bit for each input source has passed through EXCLUSIVE OR gate 14, a timing pulse is applied through line 66 to AND gate 62. The output from AND gate 62 is applied through line 68 to the input of delay line 18.

Each compare bit, C bit, from delay line 18 is passed through timing and control circuit 20 and line 70 to be applied to the ZERO side input of GENERATE FLAG flip-flop 72 and to the ONE side input of SEND RLC flip-flop 32. The GENERATE FLAG flip-flop is used to provide an alternate path for outputs from readout tap 54 as will be described in detail later. The D.-C. level output from the ONE side of GENERATE FLAG flip-flop 72 is applied as a second conditioning level to AND gate 59. Just after the last RLC bit for each source passes through timing and control circuit 20, a timing pulse is applied to line 73 and, if AND gate 59 is fully conditioned at that time, the timing pulse passes through this gate to switch TRANSMIT FLAG flip-flop 75 to its ONE state. The D.-C. level out of the ONE side of flip-flop 75 is applied to condition AND gate 77. AND gate 77 is also connected by line 56 to readout tap 54 on line 18 and, when AND gate 77 is conditioned, an output signal from readout tap 54 will pass through AND gate 77, line 74 and OR gate 42 to circuit output line 44.

The timing pulse applied to line 48 when the last RLC bit for each input source has passed through timing and control circuit 20 is also applied to lines 76 and 79 to respectively reset ADD ONE TO RLC flip-flop 26 to its ONE state and send SEND RLC flip-flop 32 to its ZERO state. The timing pulse applied to line 66 when the least significant bit for each input source has passed through EXCLUSIVE OR gate 14 is also applied to line 80 to set GENERATE FLAG flip-flop 72 to its ONE state. After the last data bit B has passed under readout tap 54, a timing pulse is applied to line 78 to reset TRANSMIT DATA flip-flop 50 to its ZERO state and to line 82 to reset flip-flop 75 to its ZERO state.

*Operation*

In describing the operation of this circuit, it will be assumed, for the sake of illustration, that the circuitry shown in the figure is located in a space vehicle, the input sources 10*a*–10*n* being data sensors (there being N sensors with M bits each) and that signals applied to line 44 are being fed to a transmitter to be transmitted to a receiver on earth. It will be further assumed that a ONE bit is represented by the presence of a signal and a ZERO bit by the absence of a signal.

Prior to the first scan of the data sources 10*a*–10*n* by multiplexor 12, the delay line 18 is empty, except for the sensor identification bits which have been prerecorded, the ADD ONE TO RLC flip-flop 76 is in its ONE state, the SEND RLC flip-flop 32 is in its ZERO state, the TRANSMIT DATA flip-flop 50 is in its ZERO state, and the GENERATE FLAG flip-flop 72 is in its ONE state.

Since, for the first scan of the sensors 10*a*–10*n*, the data bits being sent from delay line 18 on line 24 will be all ZEROS, EXCLUSIVE OR gate 14 will generate an output for at least one bit of each sensor unless that sensor has a zero reading recorded in it during the first scan. Assume that the second bit of the first sensor, $B_{12}$, is a ONE, the first bit of this sensor, $B_{11}$, being a ZERO. For this situation, the sequence of operations will be as follows:

First, the source identification bits for sensor 1 will pass through timing and control circuit 20 and line 22 to the input terminal of delay line 18. The ZERO bits stored in positions $B_{11}$–$B_{1M}$ of delay line 18 will then pass through timing and control circuit 20 and line 24 to be applied to one input of EXCLUSIVE OR gate 14 simultaneously with the application of the corresponding bits for the first frame coming from multiplexor 12. Therefore the $B_{11}$ bit stored in delay line 18 will be applied to the EXCLUSIVE OR gate simultaneously with the application of the first bit of sensor 10*a* scanned by multiplexor 12 to this same gate. Since both of these bits are ZEROS, there will be no output from gate 14 and ADD ONE TO RLC flip-flop 26 will remain in its ONE state. The ZERO bit stored in position $B_{12}$ of delay line 18 will then be passed through timing and control circuit 20 and line 24 to be applied to the EXCLUSIVE OR gate simultaneously with the application of the second bit of sensor 10*a* scanned by multiplexor 12 to this same gate. Since this second scanned bit is a ONE, the inputs applied to gate 14 will disagree and there will be an output from this gate switching ADD ONE TO RLC flip-flop 26 to its ZERO state. The remaining ZERO bits stored in positions $B_{13}$–$B_{1M}$ of delay line 18 will be compared in EXCLUSIVE OR gate 14 with the frame 1 bits scanned by multiplexor 12 in sensor 10*a*, but, since ADD ONE TO RLC flip-flop 26 has already been switched to its ZERO condition, the results of these comparisons will have no effect on the circuit. As the bits scanned in sensor 10*a* are being applied for comparison purposes to EXCLUSIVE OR gate 14, they are also being applied through line 16 to the input of delay line 18 to be used, as will be described later, in the next frame of operation. The multiplexor and the delay line are synchronized so that new bit $B_{11}$ arrives in the first cell of the delay line following the source 1 identification bits.

The $C_1$ bit coming out of delay line 18 is now passed through timing and control circuit 20 and line 70 to be applied to flip-flop 32 and 72. Since this bit (like all bits except the identification bits) is a ZERO, it will leave the SEND RLC flip-flop 32 in its ZERO state and the GENERATE FLAG flip-flop 72 in its ONE state. At this time, a timing pulse is applied to line 66, but since ADD ONE TO RLC flip-flop 26 is in its ZERO state, gate 62 will not be conditioned and a ZERO will be stored in the new $C_1$ position of delay line 18.

The bits representing the run length count for sensor 10*a* which bits are all ZERO representing a zero count, are now passed through timing and control circuit 20 and line 34 to be applied to AND gates 28 and 30. Since ADD ONE TO RLC flip-flop 26 is in its ZERO state, gate 28 will not, at this time, be conditioned; and, since SEND RLC flip-flop 32 is in its ZERO state, gate 30 will not be conditioned at this time. Therefore, the RLC bits will be suppressed and, there being no input on line 38, the positions corresponding to the run length counts for sensor 1 will have ZEROS stored in them. After the last RLC bits for sensor 1 have passed through timing and control circuit 20, timing pulses will be applied to lines 48 and 76. The timing pulse on line 48 will find AND gate 46 conditioned and will pass through this gate to switch TRANSMIT DATA flip-flop 50 to its ONE state. The timing pulse on line 76 will reset ADD ONE TO RLC flip-flop 26 to its ONE state. The first bit to appear at readout tap 54 after flip-flop 50 has been switched is the first source identification bit for sensor 1. This bit will pass through line 56, conditioned AND gate 52, line 58, and OR gate 42 to the circuit output line 44. The succeeding source identification bits for sensor 1 and the data bits for sensor 1 will be similarly passed to circuit output line 44 to be transmitted to earth, where the contents of sensor 1 will be stored. When the position in delay line 18 in which bit $B_{1M}$ is stored passes readout tap 54, a timing pulse is applied to line 78 to switch TRANSMIT DATA flip-flop 50 to its ZERO state and decondition AND gate 52.

While the sensor identification bits and the data bits for sensor 1 are being transmitted, a series of comparisons are being performed for sensor 2 in a manner identical to that described above for sensor 1. Assuming that there is a ONE bit (that there is some information) in sensor 2, a sequence of events identical to that described above will occur for sensor 2. This sequence of events will be repeated in an identical manner for each sensor in which information is stored. In this manner, the original data stored in the sensor is transmitted to earth.

However, since the storage means on earth originally has ZERO stored in it, there is no need to transmit the data from a sensor with a ZERO reading. The manner in which the transmission of this data would ordinarily be suppressed can be seen by assuming, for example, that the third sensor has a ZERO reading. The sensor identification bits for this sensor would be handled as for sensor 1 above. The ZERO data bits stored in delay line 18 would likewise be handled in the same manner but, since the input bits from the sensor to EXCLUSIVE OR gate 14 would also be ZEROS, there would be no output from the EXCLUSIVE OR gate 14 and flip-flop 26 would remain in its ONE state. Therefore, when the timing pulse is applied to line 66, AND gate 62 will be conditioned and this timing pulse will pass through line 68 to store a ONE in the $C_3$ position of delay line 18. When the ZERO RLC bits for sensor 3 are applied by timing and control circuit 20 to line 34, they will find AND gate 28 conditioned and will pass through ONE bit adder 36 and line 38 to be stored in the RLC positions for sensor 3. The count in these positions will now be ONE. Since ADD ONE TO RLC flip-flop 26 is in its ONE state, AND gate 46 will not be conditioned when a timing pulse is applied to line 48 and TRANSMIT DATA flip-flop 50 will remain in its ZERO condition. AND gate 52 will, therefore, not be conditioned and RLC data in delay line 18 would ordinarily not be transmitted; however, for reasons which will be considered later, the sensor identification bits and the data bits (all of which are ZERO) for sensor 3 are in fact passed through conditioned AND gate 77, line 74 and OR gate 42 to the circuit output line to be transmitted to ground.

Since only ONE bits are represented by signals, signals representing only the ONE bits will appear on line 44 to be transmitted to earth. It is therefore necessary that some means be provided to properly position the transmitted bits in the received data sequence as, for example, transmitting on a real-time basis and providing synchronization equipment on earth to properly locate the incoming bits in the data sequence. If a ZERO bit was represented by a signal of either different amplitude or polarity from a ONE bit, the need for the above requirements would be eliminated.

At the end of the first frame, the first scan of the sensors 10*a*–10*n*, the various data positions of delay line 18 are as shown in the figure with the data sensed in frame 1 stored in the various data positions. The circuit is now ready to start the second scan of the sensors 10*a*–10*n*. Assume that, for this scan, there is no change in any of the sensors from the value recorded for scan 1. At the end of the comparison of the bits $B_{11}$–$B_{1M}$ stored in delay line 18 with the new bits coming in from multiplexor 12. ADD ONE TO RLC flip-flop 26 would still be in its ONE state, there being no output from EXCLUSIVE OR gate 14. The timing pulse applied to line 66 would, therefore, find AND gate 62 conditioned and would generate a ONE bit on line 68 to be applied to the $C_1$ position in the delay line. RLC bits for sensor 1 (all ZEROS at this time) would pass through line 34 and conditioned AND gate 28 to ONE bit adder 36, where this count would be increased to ONE and restored over line 38 in the run-length-count-for-sensor 1 positions of delay line 18. AND gate 52 would not be conditioned but, GENERATE FLAG flip-flop 72 being in its ONE state (it will be remembered that the $C_1$ bit stored in the first frame was a ZERO), and TRANSMIT DATA flip-flop 50 being in its ZERO state, and gate 59 will be conditioned. When the timing pulse is applied to line 73 as the sensor 1 I.D. bits approach readout tap 54, TRANSMIT FLAG flip-flop 75 will be switched to its ONE state conditioning AND gate 77. The sensor-1-identification bits and the bits $B_{11}$–$B_{1M}$ for frame 2 will, therefore, on reaching readout tap 54, pass through line 56, AND gate 77, line 74, and OR gate 42 to circuit output line 44. The receiver on earth will recognize the fact that the bits transmitted during the second frame for sensor 1 are the same as the bits transmitted during the first frame and this will tell the equipment on earth that the data compactor is shifting to run length coding for this sensor. When bit $B_{1M}$ has passed readout tap 54, a timing pulse will be applied to line 82 resetting flip-flop 75 to its ZERO state to decondition AND gate 77 and prevent the transmission of any undesired information. If some other means were available to inform the equipment on earth that the compactor has shifted from direct transmission to run length coding for a given sensor, this second transmission of the same information would not be necessary; however, since the transmitter is limited to sending either bits or no-bits, and all combinations of bits and no-bits are used to convey other types of information, other means of informing the equipment on earth of this change in mode are not readily available. During frame 2, the same procedure will be followed for each other sensor as was followed for sensor 1 with the exception of sensor 3 since, the $C_3$ bit for frame 1 being a ONE, GENERATE FLAG flip-flop 72 will be switched to its ZERO condition for this sensor and no output will appear on circuit output line 44. The equipment on the ground will know from the information transmitted in the preceding frame that this sensor is operating in the RLC mode.

To further illustrate the action of this circuit, assume that several more frames have gone by in which the contents of the various sensors have remained constant. Assume further that, in, for example, the tenth frame, there is a change in the value recorded in the first sensor, that the value recorded in sensor 1 changes again in the eleventh frame, and that this new value continues to exist in the sensor during the twelfth frame. For the tenth frame, the comparison of one of the bits of sensor 1 for frame 9 stored in delay line 18 and the corresponding bit of sensor 1 for the tenth frame in EXCLUSIVE OR gate 14 will yield an output which will switch ADD ONE TO RLC flip-flop 26 to its ZERO state. The $C_1$ bit for frame 9 stored in delay line 18 will be a ONE and, when applied to line 70, will switch SEND RLC flip-flop 32 to its ONE state and GENERATE FLAG flip-flop 72 to its ZERO state. The run length count for sensor 1 (nine) stored in the delay line will, when applied to line 34, pass through conditioned AND gate 30, line 40 and OR gate 42 to the circuit output line 44. When the timing pulse is applied to line 66, it will find AND gate 62 unconditioned and the new $C_1$ bit stored in delay line 18 will be a ZERO. When timing pulse 48 is applied to AND gate 46, it will find this gate conditioned and will pass through to switch TRANSMIT DATA flip-flop 50 to its ONE state. The sensor 1 identification information now arriving at tap 54 of delay line 18 will find AND gate 52 conditioned and AND gate 77 unconditioned. The source identification bits for sensor 1 and the sensor 1 data bits including the changed data bit or bits will, therefore, be passed through line 56, conditioned AND gate 52, line 58 and OR gate 42 to the circuit output line 44. The information sent by line 44 to the transmitter will be interpreted on eath to mean that nine frames have passed since there was a change in the reading of sensor 1 and that sensor 1 now reads as transmitted.

In the eleventh frame, there is again an output from EXCLUSIVE OR gate 14 switching AND ONE TO RLC flip-flop 26 to its ZERO condition. However, since the $C_1$ bit for frame ten was a ZERO, GENERATE FLAG flip-flop 72 will remain in its ONE state and SEND RLC flip-flop 32 will remain in its ZERO state. The run length count for sensor 1 will, therefore, find neither AND gate 28 nor AND gate 30 conditioned and will be suppressed. This suppression of meaningless, ZERO-valued run length counts under control of the C bits improves the compaction ratio of the output and adds an adaptability feature to the circuit. AND gate 52 will be subsequently conditioned to pass the sensor 1 identification bits and the bits representing the news value appearing in the sensor to the circuit output line. As in frame ten, AND gate 62 being unconditioned, the $C_1$ bit stored in delay line 18 will be a ZERO.

For frame twelve, the contents of sensor 1 will not change. Therefore, there will be no output from EXCLUSIVE OR gate 14 and ADD ONE TO RLC flip-flop 26 will remain in its ONE condition. AND gate 62 being conditioned, the $C_1$ bit will be a ONE. AND gate 28 being conditioned, the run length count will be increased to ONE and pass through line 38 to be stored in the RLC positions for sensor 1. The compare bit $C_1$ for frame eleven being a ZERO, GENERATE FLAG flip-flop 72 will be in its ONE state and, TRANSMIT DATA flip-flop 50 being in its ZERO state, AND gate 59 will be conditioned to pass the timing pulse line 73 to set TRANSMIT FLAG flip-flop 75 to its ONE state. AND gate 77 will, therefore, be conditioned to pass the sensor 1 identification bits and data bits $B_{11}$–$B_{1M}$ to the output line 44. The receiver on earth will, as indicated before, interpret these two successive transmissions of the same data as an indication that the compactor has shifted back to run length coding for this sensor.

From the preceding examples, it can be seen that, when an exact comparison is obtained for a given sensor, the comparison bit, C bit, stored in delay line 18 for that sensor is a ONE, whereas, if there is any difference between the bits coming in on line 24 from delay line 18 and the inputs bits from multiplexor 12 for a given sensor, the C bit stored for that sensor will be a ZERO. If the contents of a sensor change for two successive frames, the ZERO C bit stored for the first of these frames will not switch SEND RLC flip-flop 32 to its ONE state during the succeeding frame and the RLC count will, therefore, be suppressed for the second frame. This prevents the transmission of meaningless, ZERO-valued run length counts and improves the compaction of the circuit. If there is a failure of comparison in a given frame for a sensor and a successful comparison in the succeeding frame for the same sensor, the ZERO C bit from the first frame will not switch GENERATE FLAG flip-flop 72 to its ZERO condition causing AND gate 77 to be conditioned to pass the information sensed at readout tap 54 to the circuit output line 44. This means that the same data bits will be transmitted to the ground equipment for two successive frames and the ground equipment is programmed to interpret this as an indication that the data compactor has shifted back to run length coding for that sensor.

Since the order in which the sensors send information to the circuit output line 44 is a random one, some means must be provided for identifying which sensor a particular block of information is coming from. One means of accomplishing this is shown in the figure, namely, inserting a series of identification bits before the data bits from a given sensor in the delay line and passing these identification bits with the data bits to the circuit output line. Another means of accomplishing this identification function would be to employ a counter the capacity of which was N, which counter would be stepped one position as the scan was completed for each sensor. When information was to be sent to the circuit output line, the contents of this counter would be sampled and transmitted on the output line with the data as an indication of the source of the data.

Another method of performing the identification function, which is quite useful when a random access memory is available, is to channel, by some suitable means, the output appearing for a given sensor into a unique address in the random access memory, there being a single address location in the memory associated with each sensor. This memory could then be sampled for transmission in a known order, eliminating the need for sensor identification bits. Since less bits are required to transmit data using this scheme, it gives a higher compaction ratio than those mentioned above.

While a delay line 18 has been shown in the preferred embodiment of this invention, any constant (or controllable) frequency shifting or shiftable storage means, for example, a shift register, may be substituted for delay line 18. The particular circuits used in any of the blocks shown in the figure are not part of this invention and any suitable circuits may be utilized.

While the invention has been particularly shown and described with reference to a preferred embodiment thereof, it will be understood by those skilled in the art that the foregoing and other changes in form and details may be made therein without departing from the spirit and scope of the invention.

I claim:

1. A compactor circuit for reducing the number of bits required to represent a frame of data on the compactor circuit output line, each successive frame including bits from a plurality of input sources, comprising in combination:

means for scanning the input sources to thereby generate successive frames of data; a comparison circuit capable of accepting two binary inputs and generating an output only when the inputs disagree;

a shifting storage means running at a constant frequency for shifting frames of data received at its input to its output, said storage means having identification bits for each input source stored therein; means for simultaneously applying the data from each successive frame to one input of said comparison circuit and to said storage means; timing means for applying each bit of data at the output of said storage means to the other input of said comparison circuit simultaneously with the application of the corresponding bit of the next successive frame to the first input, whereby there will be an output from said comparison circuit only when there has been a change in one of the bits of an input source;

counting means responsive to said timing means and the output of said comparison circuit for maintaining a count of the number of frames in which there has been no change in a given input source; means for storing said count at a position between the data from that given input source and the data from another input source;

means responsive to an output from said comparison circuit occurring because of a change in one of the bits of an input source, including first and second gating means for respectively causing the count for the input source in which the change occurred and the changed data from the same input source stored in said storage means to be applied in succession to the compactor circuit output line;

and means for applying to said compactor circuit output line the identification bits associated with the input source in which the change occurred.

2. The combination according to claim 1 including means for storing a compare bit in said shifting storage means in a position adjacent that in which the bits of an input source are stored;

means responsive to an output from said comparison circuit for inhibiting the storage of a compare bit when successive bits of data corresponding to an input source do not compare, and means responsive to a compare bit for energizing said first gating means, whereby the absence of a compare bit prohibits energization of said first gating means to thereby prevent transmission of the count maintained for a given input source when there have been two successive changes in data from that source.

3. A compactor circuit for reducing the number of bits required to represent a frame of data on the compactor circuit output line, each successive frame including bits from a plurality of input sources, comprising in combination:

means for scanning the input sources to thereby generate successive frames of data; a comparison circuit capable of accepting two binary inputs and generating an output only when the inputs disagree;

a delay line having a readout tap thereon intermediate its input and output, said delay line having identification bits for each input source stored therein; means for simultaneously applying the data from each successive frame to one input of said comparison circuit and to said delay line input; timing means for applying each bit of data at the output of said delay line to the other input of said comparison circuit simultaneously with the application of the corresponding bit of the next successive frame to the first input, whereby there will be an output from said comparison circuit only when there has been a change in one of the bits of an input source;

counting means responsive to said timing means and the output of said comparison circuit for maintaining a count of the number of frames in which there has been no change in a given input source;

means for storing said count at a position between the data from that given input source and the data from another input source;

flip-flop means having a first and second stable state and responsive to an output from said comparison circuit for switching from said first to said second stable state, first and second gating means enabled by said flip-flop means being in said second stable state for respectively causing the count for the corresponding input source and the data from the corresponding input source appearing at the read-out tap in said delay line to be applied in succession to said output line;

means for applying to said compactor circuit output line the identification bits associated with the input source in which the change occurred;

means responsive to said flip-flop means being in said first stable for storing a compare bit in said delay line in a position adjacent that in which the bits of the input source are stored, and means responsive to the absence of a compare bit for disabling said first gating means for the input source for the following frame.

No references cited.

MALCOLM A. MORRISON, *Primary Examiner.*